United States Patent
Blair et al.

(10) Patent No.: US 6,879,784 B1
(45) Date of Patent: Apr. 12, 2005

(54) BI-DIRECTIONAL OPTICAL/ELECTRICAL TRANSCEIVER MODULE

(76) Inventors: Thomas H. Blair, 117 S. Bernal Rd., San Jose, CA (US) 95119; Diana Ching Chen, 41712 Olympus Ave., Fremont, CA (US) 94539

( * ) Notice: Subject to any disclaimer, the term of this patent is extended or adjusted under 35 U.S.C. 154(b) by 269 days.

(21) Appl. No.: 10/236,234

(22) Filed: Sep. 6, 2002

Related U.S. Application Data

(60) Provisional application No. 60/323,142, filed on Sep. 13, 2001.

(51) Int. Cl.[7] .............................. H04B 10/00; G02B 6/26
(52) U.S. Cl. ........................ 398/139; 398/135; 385/47
(58) Field of Search ................................ 398/135–139; 385/46–52, 35, 88

(56) References Cited

U.S. PATENT DOCUMENTS

| | | | | |
|---|---|---|---|---|
| 4,767,171 A | * | 8/1988 | Keil et al. ..................... | 385/35 |
| 5,663,821 A | * | 9/1997 | Suda et al. ................... | 398/139 |
| 5,867,622 A | * | 2/1999 | Miyasaka et al. ............. | 385/88 |
| 2002/0191917 A1 | * | 12/2002 | Wu et al. ..................... | 385/47 |

* cited by examiner

Primary Examiner—Phan T. H. Palmer
(74) Attorney, Agent, or Firm—Parsons & Goltry; Robert A. Parsons; Michael W. Goltry

(57) ABSTRACT

A bi-directional optoelectric transceiver module comprising a bi-directional element with a plate positioned on a side of the bi-directional element wherein the plate is coated with a reflection enhancing coating which reflects light at a first wavelength emitted by a light emitting device and which transmits light emitted by an optical fiber at a second wavelength wherein a light detecting device is positioned to detect at least one of the first and second wavelengths of light.

24 Claims, 6 Drawing Sheets

US 6,879,784 B1

BI-DIRECTIONAL OPTICAL/ELECTRICAL TRANSCEIVER MODULE

CROSS-REFERENCED TO RELATED APPLICATION

Figure 1:
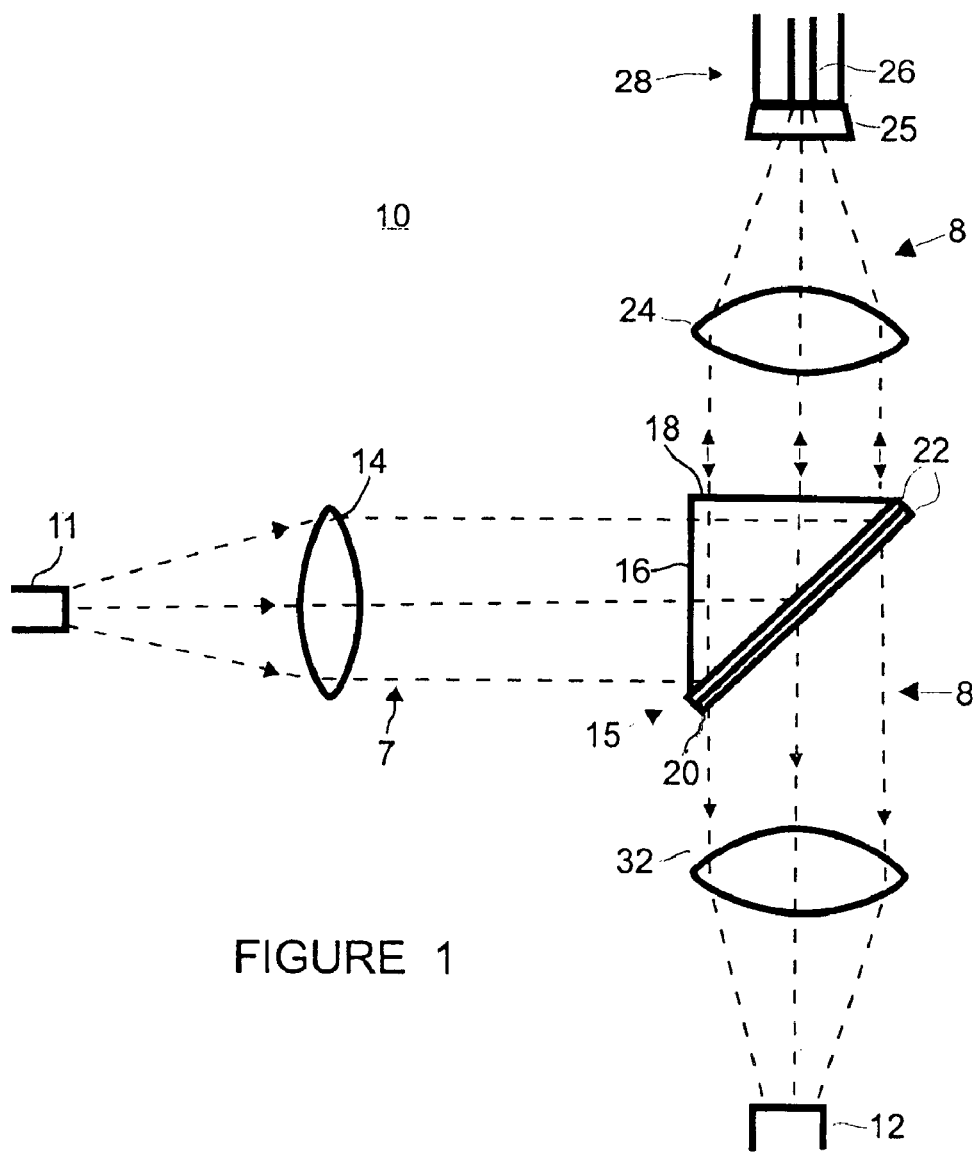

This application claims the benefit of provisional application No. 60/323,142, filed 13 Sep. 2001.

FIELD OF THE INVENTION

This invention relates to optical-to-electrical and electrical-to-optical modules and more particularly to bi-directional optics in such modules.

BACKGROUND OF THE INVENTION

At the present time, transmitting data by optical fibers is very popular. Optical fibers have a large number of advantages over the standard wire transmission devices, including much higher transmission frequencies, less losses, and much higher data rates. Generally, in the present communication systems, each optical fiber has a module that includes a transmission channel and a reception channel at each end. One of the pair of channels receives electrical signals, converts the electrical signals to an optical (light) beam by way of a laser or the like and introduces the beam into one end of the optical fiber, which then transmits the modulated optical beam to a similar module at the other end of the optical fiber. The second channel of the module receives modulated optical beams from the optical fiber, conveys the modulated optical beam to a photo diode or the like, which converts the optical beam back to an electrical signal. A problem with this system is the number of components that must be used at each end of both fibers to receive signals and convert the signals to optical or electrical signals.

It would be highly advantageous, therefore, to remedy the foregoing and other deficiencies inherent in the prior art.

Accordingly, it is an object of the present invention to provide a new and improved bi-directional optoelectric transceiver module.

It is an object of the present invention to provide a new and improved bi-directional optoelectric transceiver module which can receive and transmit optical signals using a single channel.

It is another object of the present invention to provide a new and improved bi-directional optoelectric transceiver module which includes fewer components.

It is still another object of the present invention to provide a new and improved bi-directional optoelectric transceiver module which is easier to optically align.

SUMMARY OF THE INVENTION

To achieve the objects and advantages specified above and others, a bi-directional optoelectric transceiver module is disclosed. In a preferred embodiment, the bi-directional optoelectric transceiver module includes a bi-directional element with a plate positioned on a side of the bi-directional element wherein the plate is coated with a reflection enhancing coating which reflects light at a first wavelength and transmits light at a second wavelength. In the preferred embodiment, the bi-directional element and the plate can include glass, plastic, or another suitable optically transparent material which can be molded.

In the preferred embodiment, a lens system is positioned to focus light at the first wavelength and a second lens system is positioned to focus light at the second wavelength. In the preferred embodiment, the bi-directional element and the lens systems are formed as a single unit of a molded plastic.

The reflection enhancing coating can include silicon oxide (SiO), titanium oxide (TiO), tantalum oxide (TaO), magnesium fluoride (MgF), or another suitable coating material which reflects light at the first wavelength and transmits light at the second wavelength. In the preferred embodiment, the reflection enhancing coating includes a plurality of material layers wherein a thickness of each of the plurality of material layers is chosen so that the reflection enhancing coating reflects light at the first wavelength and transmits light at the second wavelength.

BRIEF-DESCRIPTION OF THE DRAWINGS

Referring to the drawings:

FIGS. 1 through 6 are simplified schematic/ray diagrams of six different embodiments of bi-directional optoelectric transceiver modules in accordance with the present invention.

DETAILED DESCRIPTION OF THE PREFERRED EMBODIMENT

Referring to FIG. 1, a simplified schematic/ray diagram is illustrated of an embodiment of a bi-directional optoelectric transceiver module 10 in accordance with the present invention. The transceiver of module 10 includes a device 11, which may be a laser or other device that converts electrical signals to optical signals in a well-known manner. The transceiver of module 10 also includes a photodetector device 12, which may be a photodiode or other device that converts optical signals to electrical signals. For convenience and simplicity of understanding, devices for converting electrical signals to optical signals will be referred to generally as lasers and devices for converting optical signals to electrical signals will be referred to generally as photodetectors throughout this disclosure with the understanding that any other device that performs the same function can be substituted.

In this disclosure, laser 11 generates light at a wavelength $\lambda_1$ along an optical axis 7 and photodetector 12 receives light at a wavelength $\lambda_2$ along an optical axis 8. As will be understood after a careful study of the detailed description below, the specific wavelengths of $\lambda_1$ and $\lambda_2$ are selected in accordance with various materials utilized in module 10 to enhance the reflection and/or transmission of the light between laser 11 and the optical fiber or to enhance the reflection and/or transmission of the light between the optical fiber and photodetector 12. In one specific example, $\lambda_1$ and $\lambda_2$ are 850 nm and 1310 nm, or vice versa. It should also be understood that through the use of different materials the positions of laser 11 and photodetector 12, as described in detail below, could be reversed.

The beam of light generated by laser 11 is focused by a lens system, including one or more lenses (illustrated as a single lens 14), onto a bi-directional element 15. Element 15 is a prism formed of material, such as glass, plastic, etc., that is transparent to light generated by laser 11 (light at wavelength $\lambda_1$) and light received by photodetector 12 (light at wavelength $\lambda_2$). The prism has a triangular cross-section with a side 16 positioned generally perpendicular to the light beam generated by laser 11, a side 18 generally perpendicular to side 16, and a side 20 oriented at an angle (in this embodiment 45°) to the light beam generated by laser 11. In the preferred embodiment, optical axes 7 and 8 intersect at approximately side 20. Thus, light from laser 11 enters side 16 of the prism with a minimum of reflection and is reflected by side 20 approximately 90° out through side 18.

Side 20 has a coating 22 of multiple layers of material that is selected and designed to enhance the reflection of light at wavelength $\lambda_1$. Thus, substantially all of the light generated by laser 11 is reflected by side 20 and coating 22 out through side 18 along optical axis 8. The reflected light emanating from side 18 is focused by a lens system, including one or more lenses (illustrated as a single lens 24), through an optional anti-reflection glass plate 25 onto the glass core 26 of an optical fiber 28. Glass plate 25 is positioned in abutting engagement with the end of optical fiber 28 to reduce reflections from the end of core 26 and to provide a better coefficient match between core 26 and the material between lens 24 and core 26 (generally air).

Light at wavelength $\lambda_2$ conducted by optical fiber 28 from an external source is focused by lens 24 through side 18 onto side 20 of element 15 along axis 8. Coating 22 on side 20 of element 15 is selected and designed to enhance the transmission (non-reflection) of light at wavelength $\lambda_2$ out through side 20. The light passing out of side 20 of element 15 is focused by a lens system, including one or more lenses (illustrated as a single lens 32), along axis 8 and onto photodetector 12. Thus, substantially all of the light from optical fiber 28 entering element 15 is transmitted through side 20 and coating 22 to photodetector 12. As stated generally above, wavelengths $\lambda_1$ and $\lambda_2$ and coating 22 are selected to provide maximum reflection and transmission, respectively of the generated or received light. It will be understood that because of the difference in wavelengths for transmission and reception and the separation performed by element 15, these functions can be performed simultaneously with little or no interference. Any leakage of light that may occur can be removed by electrical and/or optical filtering, if deemed beneficial. Also, wavelengths $\lambda_1$ and $\lambda_2$ and coating 22 can be selected to reverse the positions of laser 11 and photodetector 12 if desired.

In a specific example, coating 22, or any of the subsequently discussed coatings performing the same functions, includes a layer or layers of material that form a mirror for one of the frequencies and directly transmits the other frequency. Typical examples of materials that perform this function are: silicon oxide (SiO); titanium oxide (TiO); tantalum oxide (TaO); magnesium fluoride (MgF); and combinations of these materials or similar materials. Here it will be understood by those skilled in the art that the number of layers, the thickness of the layers and the index of refraction of the material can be utilized to produce a mirror for one wavelength and a direct passage for another wavelength. Typical examples of mirrors formed from dielectrics and from semiconductor materials can be found in the laser art.

In a slightly different embodiment, some small amount of light from laser 11 can be allowed to pass through element 15 to photodetector 12. In addition to the normal communication (receiver) channel incorporating photodetector 12, photodetector 12 is connected into a circuit that is used to monitor and control the output of laser 11. In its simplest form the receiver channel circuitry and the monitor and control circuitry can be switched so as to alternatively connect photodetector 12 into one or the other of the circuits. In this form transmission or reception by module 10 would be performed separately. In a slightly more complicated form, electrical signals produced by light at wavelength $\lambda_1$ are filtered from electrical signals produced by light at wavelength $\lambda_2$, with the electrical signals produced by light at wavelength $\lambda_1$ being used to monitor and control the output of laser 11.

Figure 2:
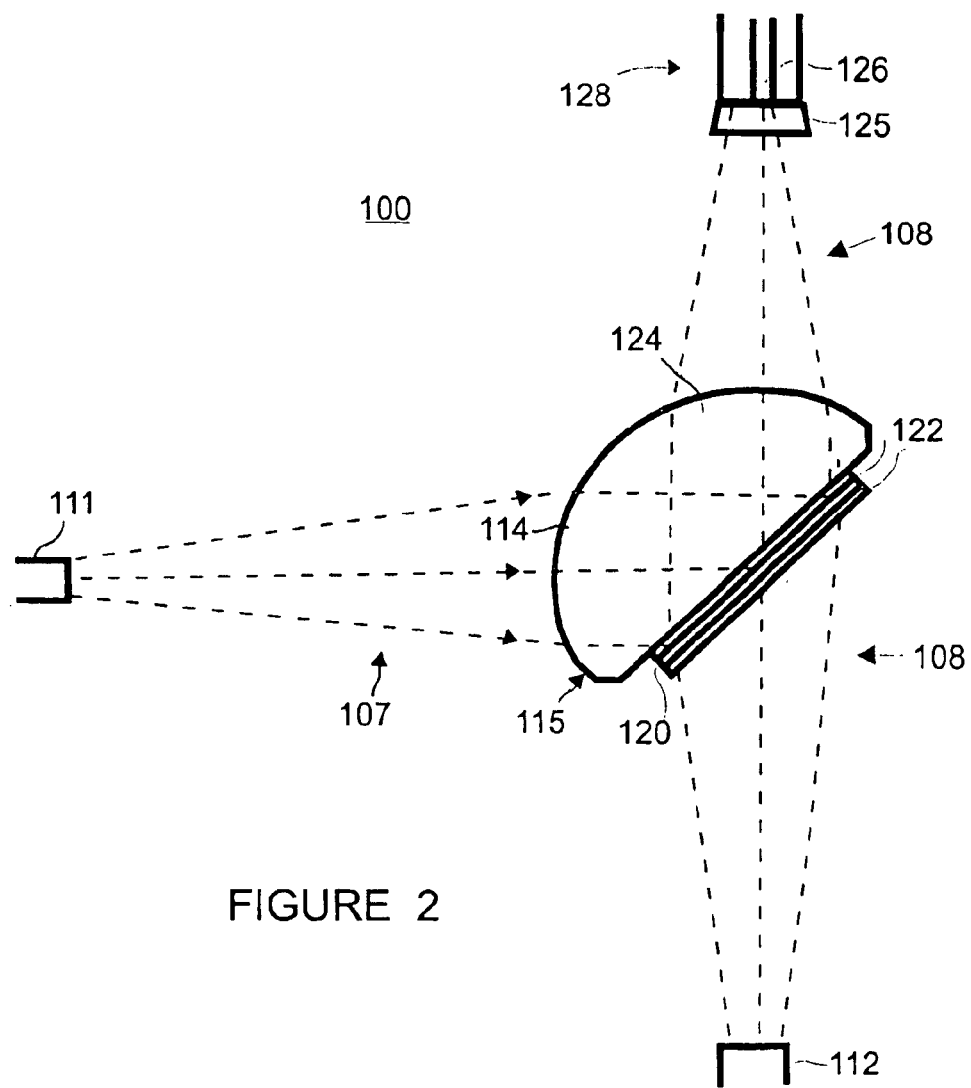

Turning now to FIG. 2, a simplified schematic/ray diagram is illustrated of another embodiment of a bi-directional optoelectric transceiver module 100 in accordance with the present invention. Components in module 100 which are similar to components in module 10 of FIG. 1 are designated with similar numbers having a 1 added to indicate the different embodiment. Also, the above description of the various components in FIG. 1 applies equally to similar components in FIG. 2.

In module 100, element 115 is preferably formed from molded plastic and includes a lens 114, which focuses light generated by laser 111 at wavelength $\lambda_1$ along an optical axis 107 and onto a side 120 that performs the same function as side 20 in FIG. 1. In the preferred embodiment, a reflection enhancing coating 122 of multiple layers of material is applied to side 120 to direct substantially all light generated by laser ill at wavelength $\lambda_1$ out through a lens 124 along an optical axis 108. However, it will be understood that coating 122 can be positioned proximate to side 120 using other means, such as applying coating 122 to a plate wherein the plate is positioned adjacent to side 120. Lens 124 focuses light reflected by side 120 and coating 122 from element 115 onto glass plate 125 and thence into optical fiber 128. By molding lenses 114 and 124 into the body of element 115, a substantial saving in components and assembly can be realized, since mounting and alignment of the lenses are eliminated.

Light at wavelength $\lambda_2$, conducted by optical fiber 128 from an external source, is focused by lens 124 onto side 120 of element 115. Coating 122 on side 120 of element 115 is further selected to enhance the transmission of light at wavelength $\lambda_2$ out through side 120 along axis 108. The light passing through side 120 of element 115 is prefocused by lens 124 onto photodetector 112. Here it will be noted that lens 124 is positioned to perform two different focusing functions. It should also be noted that lens 24 in FIG. 1 can be used in a similar fashion (thereby eliminating lens 32) or an additional lens can be incorporated into module 100, if desired. Thus, substantially all of the light from optical fiber 128 entering element 115 is transmitted through side 120 and coating 122 to photodetector 112. It should be understood that coating 122 can be applied to side 120 in any convenient sequence.

Figure 3:
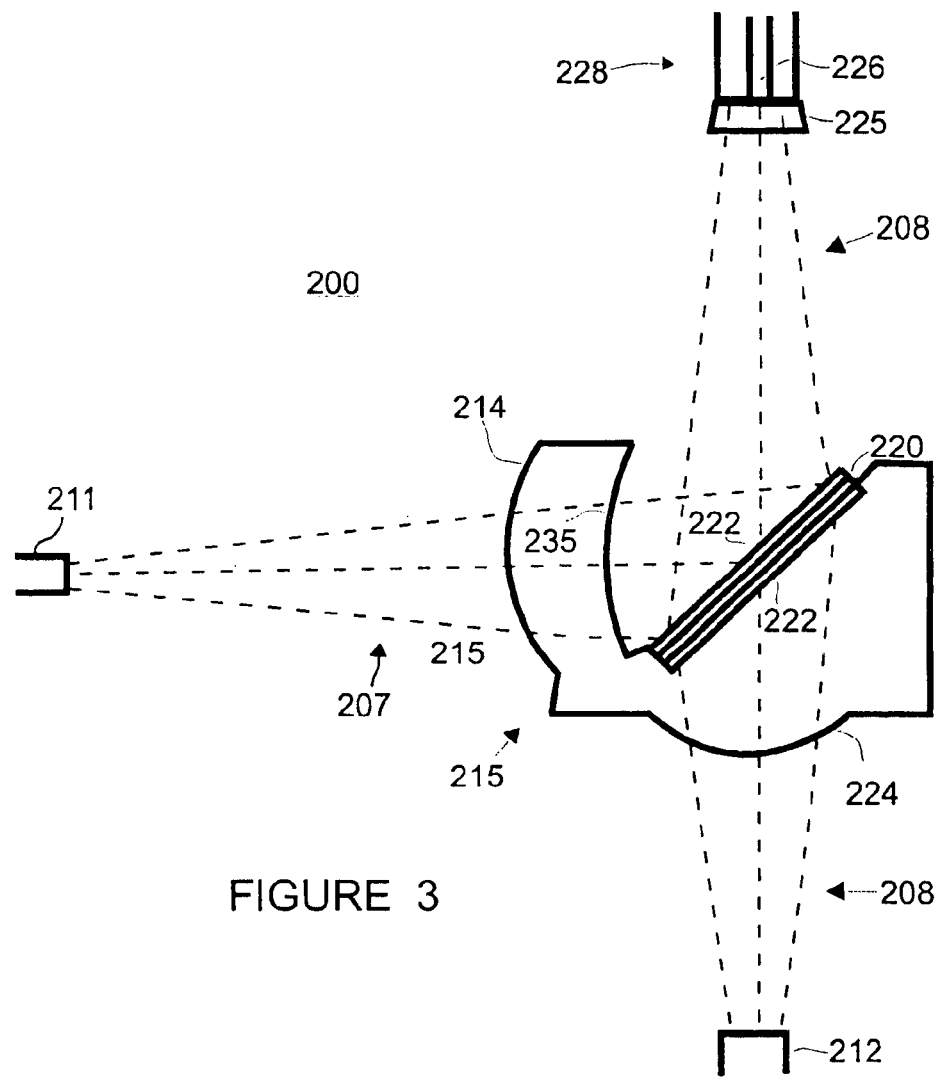

Turning now to FIG. 3, a simplified schematic/ray diagram is illustrated of another embodiment of a bi-directional optoelectric transceiver module 200 in accordance with the present invention. Components in module 200 which are similar to components in module 10 of FIG. 1 are designated with similar numbers having a 2 added to indicate the different embodiment. Also, the above description of the various components in FIG. 1 applies equally to similar components in FIG. 3.

In module 200, element 215 is preferably formed from molded plastic and includes a lens 214, which focuses light generated by laser 211 at wavelength $\lambda_1$ along an optical axis 207 and onto a side 220 that performs the same function as side 20 in FIG. 1. In the preferred embodiment, a reflection enhancing coating 222 including multiple layers of material is applied to side 220 to reflect substantially all light generated by laser 211 at wavelength $\lambda_1$ toward optical fiber 228 along optical axis 208. Light reflected by side 220 is prefocused by lens 214 onto plate 225 and thence into core 226 of optical fiber 228, in this preferred embodiment, but additional lenses can be incorporated if desired. Also, lens 214 is formed as a projection spaced from side 220 and presenting a rear surface 235 to plate 220. Surface 235 is curved to direct back-reflected light (i.e. light which would be reflected back into laser 211) away from laser 211 so as to reduce or eliminate this back-reflected light.

Light at wavelength $\lambda_2$, conducted by optical fiber 228 from an external source, impinges directly onto side 220 of element 215. Coating 222 on side 220 of element 215 is selected to enhance the transmission of light at wavelength $\lambda_2$ through side 220 along optical axis 208 and into element 215. The light passing through side 220 into element 215 is focused by lens 224 onto photodetector 212. It should be noted that lens 32 in FIG. 1 can be used in a similar fashion (thereby eliminating lens 24) or an additional lens can be incorporated into module 200, if desired. Thus, substantially all of the light from optical fiber 228 entering element 215 is transmitted through side 220 and coating 222 to photodetector 212. It should be understood that coating 222 can be applied to side 220 in any convenient sequence. By molding lenses 214 and 224 into the body of element 215, a substantial saving in components and assembly can be realized, since mounting and alignment of individual lenses are eliminated.

Figure 4:
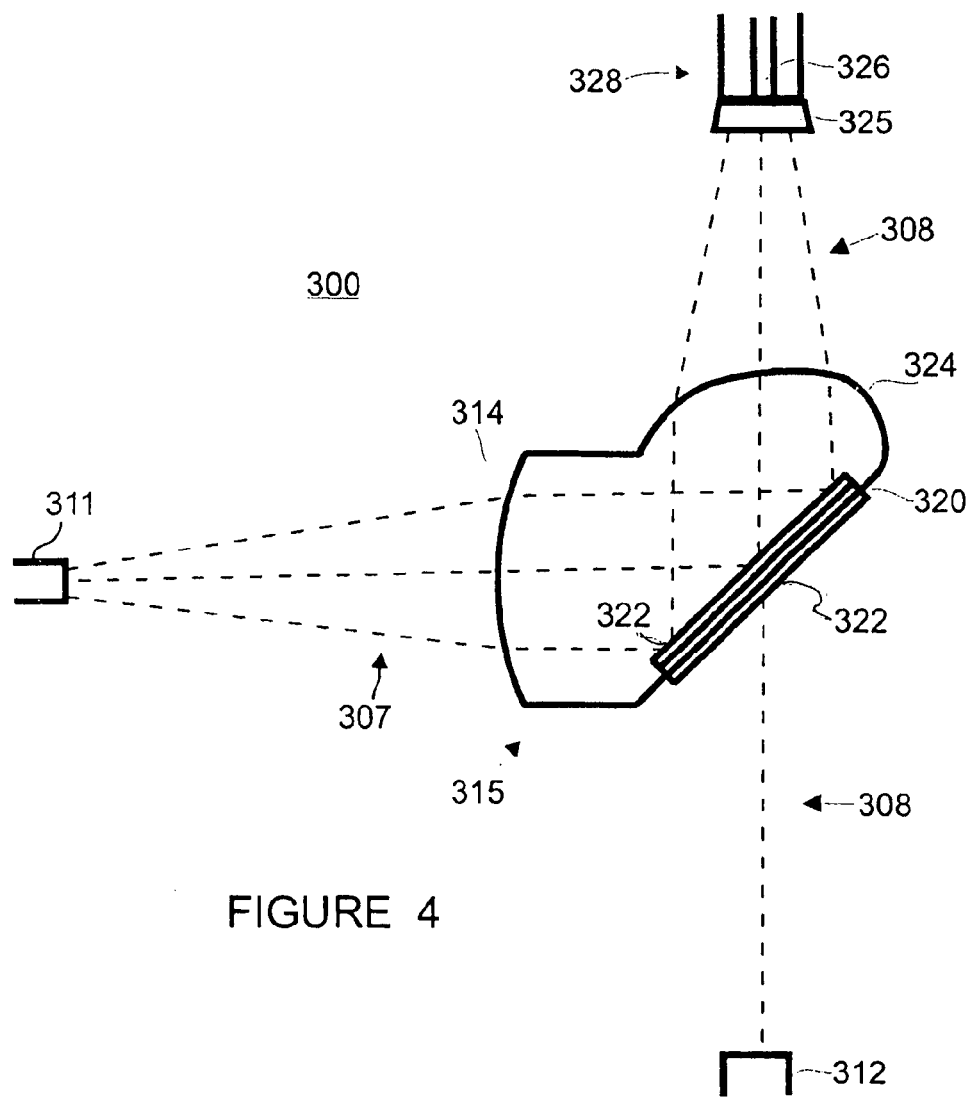

Turning now to FIG. 4, a simplified schematic/ray diagram is illustrated of another embodiment of a bi-directional optoelectric transceiver module 300 in accordance with the present invention. Components in module 300 which are similar to components in module 10 of FIG. 1 are designated with similar numbers having a 3 added to indicate the different embodiment. Also, the above description of the various components in FIG. 1 applies equally to similar components in FIG. 4.

In module 300, element 315 is preferably formed from molded plastic and includes a lens 314, which focuses light generated by laser 311 at wavelength $\lambda_1$ along an optical axis 307 and onto a side 320 that performs the same function as side 20 in FIG. 1. Side 320 is preferably glass but could be a plastic or any other material which is capable of performing the described functions and which can be easily and conveniently incorporated into molded element 315. A reflection enhancing coating 322 including multiple layers of material is applied to side 320 to reflect substantially all light generated by laser 311 at wavelength $\lambda_1$ toward optical fiber 328. Light reflected by side 320 is focused by lens 324 onto core 326 of optical fiber 328 along an optical axis 308, in this preferred embodiment, but additional lenses can be incorporated if desired.

Light at wavelength $\lambda_2$, conducted by optical fiber 328 from an external source, impinges directly onto side 320 of element 315 along axis 308. Coating 322 on side 320 of element 315 is further selected to enhance the transmission of light at wavelength $\lambda_2$ through side 320. The light passing through element 315, including side 320, is prefocused by lens 324 onto photodetector 312 along axis 308. It should be noted that lens 24 in FIG. 1 can be used in a similar fashion (thereby eliminating lens 32) or an additional lens can be incorporated into module 300, if desired. Thus, substantially all of the light from optical fiber 328 entering element 315 is transmitted through side 320 and coating 322 to photodetector 312. It should be understood that coating 322 can be applied to side 320 in any convenient sequence. By molding lenses 314 and 324 into the body of element 315, a substantial saving in components and assembly can be realized, since mounting and alignment of the lenses are eliminated.

Figure 5:
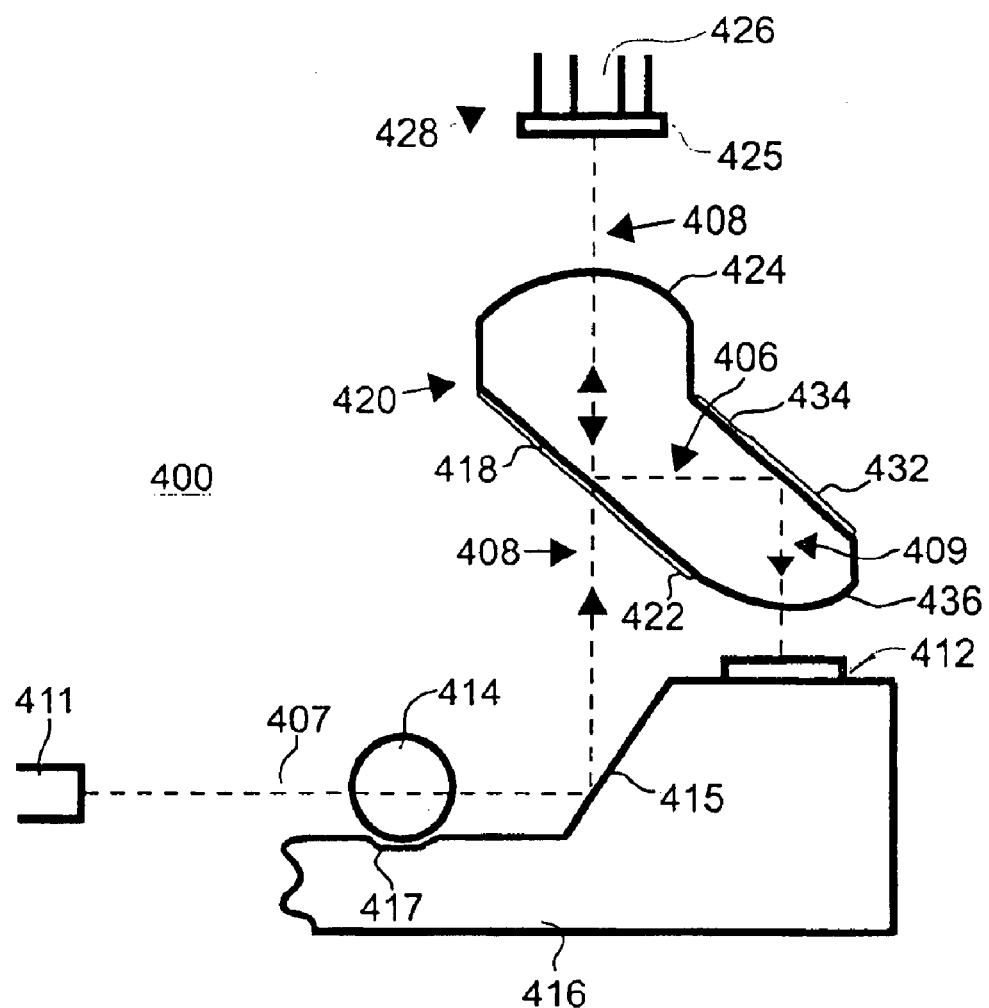

Turning now to FIG. 5, a simplified schematic/ray diagram is illustrated of another embodiment of a bi-directional optoelectric transceiver module 400 in accordance with the present invention. In this disclosure, a laser 411 generates light at a wavelength $\lambda_1$ along an optical axis 407 and a photodetector 412 receives light at a wavelength $\lambda_2$ along an optical axis 409. The beam of light generated by laser 411 is focused by a lens system, including one or more lenses (illustrated as a single glass ball 414), onto an angled surface 415. In this embodiment glass ball 414, surface 415, photodetector 412, and laser 411 are, or optionally can be, mounted on a common substrate 416, such as a silicon substrate on which some or all of the components are formed and/or mounted using common semiconductor fabrication processes.

Glass ball 414 is spherical and constructed with a diameter such that it operates like an optical lens with the desired characteristics. In this embodiment, glass ball 414 is mounted in a depression or cavity 417 in substrate 416, by means of an adhesive or the like. Cavity 417 can be accurately machined, using standard semiconductor techniques, to eliminate any alignment problems. Light from laser 411 is focused by glass ball 414 onto angled surface 415, which reflects the light at approximately 90° onto a surface 418 of an element 420.

Element 420 is formed of material, such as glass, plastic, etc., that is transparent to light generated by laser 411 (light at wavelength $\lambda_1$) and light received by photodetector 412 (light at wavelength $\lambda_2$). Surface 418 has a coating 422 including multiple layers of material which is selected to enhance the transmission of light at wavelength $\lambda_1$ along an optical axis 408 through surface 418 and element 420. The light passing through element 420 and coating 422 is focused by a lens 424, integrally molded into element 420, through a glass plate 425 onto glass core 426 of an optical fiber 428. Glass plate 425 is positioned in abutting engagement with the end of optical fiber 428 to reduce reflections from the end of core 426 and to provide a better coefficient match between core 426 and the material between lens 424 and core 426 (generally air). Thus, substantially all of the light generated by laser 411 is transmitted by coating 422 and element 420 to optical fiber 428 along optical axis 408.

Light at wavelength $\lambda_2$ conducted by optical fiber 428 from an external source is focused by lens 424 onto surface 418 of element 420 along axis 408. Coating 422 on surface 418 of element 420 is further selected to enhance the reflection of light at wavelength $\lambda_2$ within element 420. The light reflected within element 420 is reflected a second time by a surface 432 of element 420 along an optical axis 406. Surface 432 also has a coating 434 which is selected to enhance the reflection of light at wavelength $\lambda_2$ within element 420. Light reflected by surface 432 is focused by a lens 436 along axis 409, formed integrally in element 420, onto photodetector 412, mounted on substrate 416. Thus, substantially all of the light from optical fiber 428 entering element 420 is reflected by surfaces 418 and 432 to photodetector 412. As stated generally above, wavelengths $\lambda_1$ and $\lambda_2$ and coatings 422 and 434 are selected to provide maximum transmission and reflection, respectively, of the generated or received light.

By molding lenses 424 and 436 into the body of element 420, a substantial saving in components and assembly can be realized, since mounting and alignment of the lenses are eliminated. It will be understood that because of the difference in wavelengths for transmission and reception and the separation performed by element 420, these functions can be performed simultaneously with little or no interference. Any leakage of light that may occur can be removed by electrical and/or optical filtering, if deemed beneficial. Also, wavelengths $\lambda_1$ and $\lambda_2$ and coatings 422 and 434 can be selected to reverse the positions of laser 411 and photodetector 412 if desired.

Also in this embodiment, some small amount of light from laser 411 can be allowed to pass through element 420 to photodetector 412. In addition to the normal communication (receiver) channel incorporating photodetector 412, photodetector 412 is connected into a circuit that is used to monitor and control the output of laser 411. In its simplest form the receiver channel circuitry and the monitor and control circuitry can be switched so as to alternatively connect photodetector 412 into one or the other of the circuits. In this form transmission or reception by module 400 would be performed separately. In a slightly more complicated form, electrical signals produced by light at wavelength $\lambda_1$ are filtered from electrical signals produced by light at wavelength $\lambda_2$, with the electrical signals produced by light at wavelength $\lambda_1$ being used to monitor and control the output of laser 411.

Figure 6:
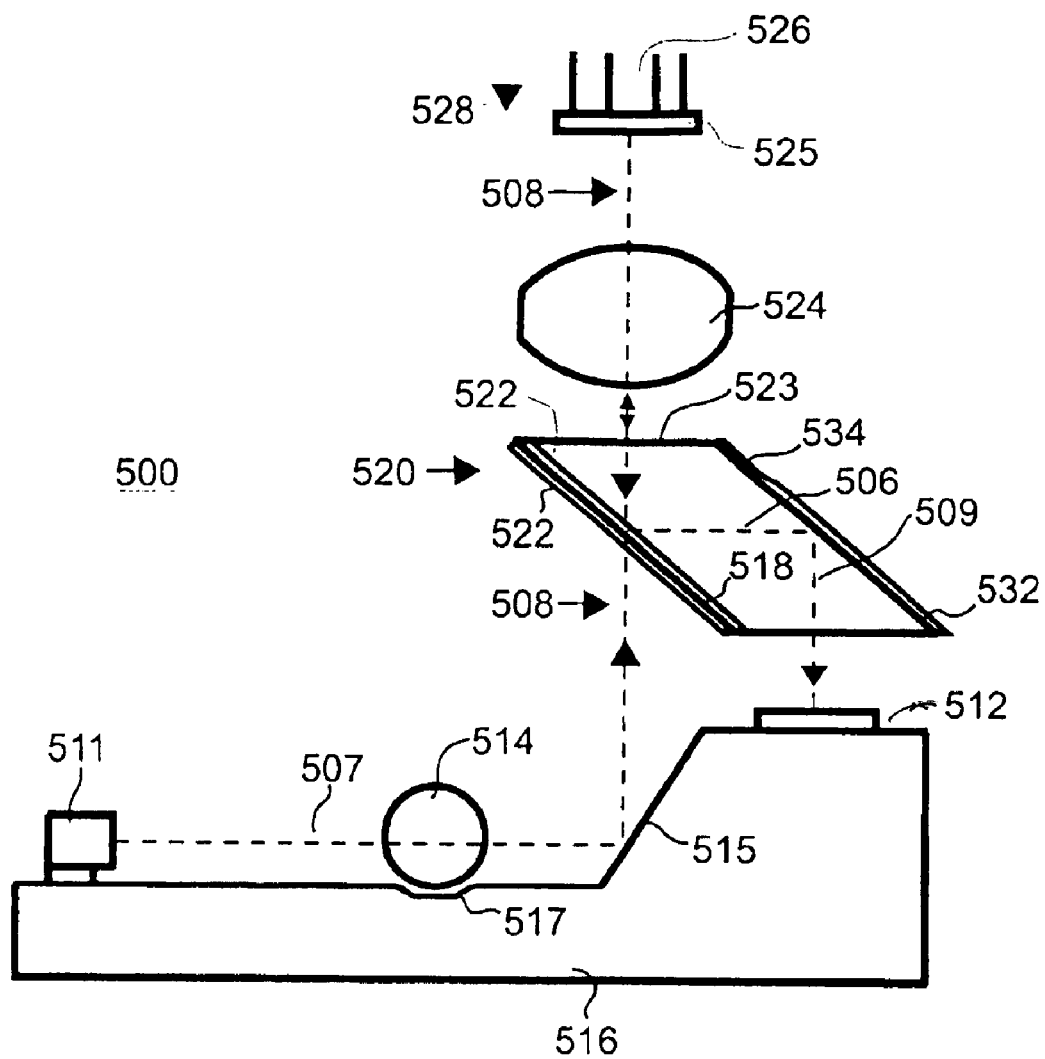

Turning now to FIG. 6, a simplified schematic/ray diagram is illustrated of another embodiment of a bi-directional optoelectric transceiver module 500 in accordance with the present invention. In this disclosure, a laser 511 generates light at a wavelength $\lambda_1$ and a photodetector 512 receives light at a wavelength $\lambda_2$. The beam of light generated by laser 511 is focused by a lens system, including one or more lenses (illustrated as a single glass ball 514), onto an angled surface 515. In this embodiment glass ball 514, surface 515, photodetector 512, and laser 511 are, or optionally can be, mounted on a common substrate 516, such as a silicon substrate on which some or all of the components are formed and/or mounted using common semiconductor fabrication processes.

Glass ball 514 is circular and constructed with a diameter such that it operates like an optical lens with the desired characteristics. In this embodiment, glass ball 514 is mounted in a depression or cavity 517 in substrate 516, by means of an adhesive or the like. Cavity 517 can be accurately machined, using standard semiconductor techniques, to eliminate any alignment problems. Light from laser 511 is focused by glass ball 514 onto angled surface 515, which reflects the light at approximately 90° onto a surface 518 of an element 520.

In this embodiment element 520 is a four-sided parallel-epiped formed of material, such as glass, plastic, etc., that is transparent to light generated by laser 511 (light at wavelength $\lambda_1$) and light received by photodetector 512 (light at wavelength $\lambda_2$) Surface 518 has a coating 522 which is selected to enhance the transmission of light at wavelength $\lambda_1$ through surface 518 and element 520 and out an upper end 523. The light passing through element 520 and coating 522 is focused by a lens 524 through a glass plate 525 onto the glass core 526 of an optical fiber 528. Glass plate 525 is positioned in abutting engagement with the end of optical fiber 528 to reduce reflections from the end of core 526 and to provide a better coefficient match between core 526 and the material between lens 524 and core 526 (generally air). Here it should be noted that lens 524 can be any commercially available "off-the-shelf" lens, either plastic or glass. Thus, substantially all of the light generated by laser 511 is transmitted by coating 522 and element 520 to optical fiber 528.

Light at wavelength $\lambda_2$ conducted by optical fiber 528 from an external source is focused by lens 524 through upper end 523 and onto surface 518 of element 520. Coating 522 on surface 518 of element 520 is further selected to enhance the reflection of light at wavelength $\lambda_2$ within element 520. The light reflected within element 520 is reflected a second time by a surface 532 of element 520. Surface 532 also has a coating 534 which is selected to enhance the reflection of light at wavelength $\lambda_2$ within element 520. Light reflected by surfaces 518 and 532 is prefocused by lens 524 out through a lower end 535 of element 520 onto photodetector 512, mounted on substrate 516. Thus, substantially all of the light from optical fiber 528 entering element 520 is reflected by surfaces 518 and 532 to photodetector 512. As stated generally above, wavelengths $\lambda_1$ and $\lambda_2$ and coatings 522 and 534 are selected to provide maximum transmission and reflection, respectively of the generated or received light. It will be understood that because of the difference in wavelengths for transmission and reception and the separation performed by element 520, these functions can be performed simultaneously with little or no interference. Any leakage of light that may occur can be removed by electrical and/or optical filtering, if deemed beneficial. Also, wavelengths $\lambda_1$ and $\lambda_2$ and coatings 522 and 534 can be selected to reverse the positions of laser 511 and photodetector 512 if desired and can be provided as multiple layers on either or both sides of the supporting plates.

Also in this embodiment, some small amount of light from laser 511 can be allowed to pass through element 520 to photodetector 512. In addition to the normal communication (receiver) channel incorporating photodetector 512, photodetector 512 is connected into a circuit that is used to monitor and control the output of laser 511. As understood by those skilled in the semiconductor art, both circuits can be integrated onto a common chip with photodetector 512, if desired. In its simplest form the receiver channel circuitry and the monitor and control circuitry can be switched so as to alternatively connect photodetector 512 into one or the other of the circuits. In this form transmission or reception by module 500 would be performed separately. In a slightly more complicated form, electrical signals produced by light at wavelength $\lambda_1$ are filtered from electrical signals produced by light at wavelength $\lambda_2$, with the electrical signals produced by light at wavelength $\lambda_1$ being used to monitor and control the output of laser 511.

It will be understood that any or all of the various components and embodiments discussed above can be incorporated into any of the various embodiments. Also, any specific components or materials described can generally be replaced with equivalent components or materials capable of performing the described functions.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A bi-directional optoelectric transceiver module comprising:

a bi-directional element with a side, a first optical axis, and a second optical axis wherein the first and second optical axes intersect approximately at the side of the bi-directional element;

a reflection enhancing coating with a thickness positioned on the side of the bi-directional element wherein the reflecting enhancing coating reflects light at a first wavelength and transmits light at a second wavelength;

a first lens system positioned along the first optical axis to focus light along the first optical axis;

a second lens system positioned along the second optical axis to focus light along the second optical axis;

a light emitting device capable of emitting light at the first wavelength along the first optical axis;

a light guiding device capable of transmitting light at the second wavelength along the second optical axis and receiving light at the first wavelength along the second optical axis; and a light detecting device capable of detecting at least one of the first and second wavelengths of light along the second optical axis.

2. An apparatus as claimed in claim 1 wherein the reflection enhancing coating includes at least one of silicon oxide (SiO), titanium oxide (TiO), tantalum oxide (TaO), magnesium fluoride (MgF), and another suitable coating material which reflects light at the first wavelength and transmits light at the second wavelength.

3. An apparatus as claimed in claim 2 wherein the reflection enhancing coating includes a plurality of material layers with a thickness wherein the thickness of each of the plurality of material layers is chosen so that the reflection enhancing coating reflects light at the first wavelength and transmits light at the second wavelength.

4. An apparatus as claimed in claim 1 wherein the reflection enhancing coating includes a plate.

5. An apparatus as claimed in claim 4 wherein at least one of the bi-directional element and the plate includes at least one of glass, plastic, and another suitable optically transparent material which can be molded.

6. An apparatus as claimed in claim 1 wherein the bi-directional element, the first lens system, and the second lens system are formed as a single unit of a molded plastic.

7. An apparatus as claimed in claim 1 wherein the light emitting device and the light detecting device are formed on a common substrate.

8. A bi-directional optoelectric transceiver module comprising:
- a bi-directional element with a first side, a second side, a third side, and a fourth side wherein the third side is opposite the first side and the fourth side is opposite the second side;
- a reflection enhancing coating with a thickness positioned on the first and third sides of the bi-directional element wherein the reflection enhancing coating transmits light at a first wavelength and reflects light at a second wavelength;
- wherein a first optical axis is directed through the first and second sides;
- wherein a second optical axis is directed through the third and fourth sides;
- wherein a third optical axis is directed through the first and third sides and intersects the first optical axis at the first side and the second optical axes at the third side so that light incident to the first side at the second wavelength is reflected along the third optical axis to the third side;
- a first lens system positioned along the first optical axis to focus light along the first optical axis;
- a second lens system positioned along the second optical axis to focus light along the second optical axis;
- a light emitting device capable of emitting light at the first wavelength along the first optical axis;
- a light guiding device capable of transmitting light at the second wavelength along the first optical axis and receiving light at the first wavelength along the first optical axis; and
- a light detecting device capable of detecting light at the second wavelength along the second optical axis.

9. An apparatus as claimed in claim 8 wherein the reflection enhancing coating includes a plate.

10. An apparatus as claimed in claim 9 wherein the light emitting device and the light detecting device are formed on a common substrate.

11. An apparatus as claimed in claim 10 wherein a spherical lens is positioned on the common substrate to focus light emitted from the light emitting device.

12. An apparatus as claimed in claim 11 wherein a reflective device is formed on the common substrate to reflect light focused by the spherical lens along the first optical axis.

13. An apparatus as claimed in claim 9 wherein at least one of the bi-directional element and the plate includes at least one of glass, plastic, and another suitable optically transparent material which can be molded.

14. An apparatus as claimed in claim 9 wherein the bi-directional element, the first lens system, and the second lens system are formed as a single unit of a molded plastic.

15. An apparatus as claimed in claim 9 wherein the first lens system focuses light at the first wavelength in a direction along the first optical axis and focuses light at the second wavelength in an opposite direction along the first optical axis.

16. An apparatus as claimed in claim 9 wherein the reflection enhancing coating includes at least one of silicon oxide (SiO), titanium oxide (TiO) tantalum oxide (TaO), magnesium fluoride (MgF), and another suitable coating material which reflects light at the first wavelength and transmits light at the second wavelength.

17. An apparatus as claimed in claim 9 wherein the reflection enhancing coating includes a plurality of material layers with a thickness wherein the thickness of each of the plurality of material layers is chosen so that the reflection enhancing coating transmits light at the first wavelength and reflects light at the second wavelength.

18. A method of optoelectronically communicating with a light guiding element comprising the steps of:
- providing a bi-directional element with a side, a first optical axis, and a second optical axis wherein the first and second optical axes intersect approximately at the side of the bi-directional optical element;
- coating the side of the bi-directional element with a reflection enhancing coating with a thickness which reflects light at a first wavelength and transmits light at a second wavelength;
- positioning a first lens system along the first optical axis to focus light along the first optical axis;
- positioning a second lens system along the second optical axis to focus light along the second optical axis;
- positioning a light emitting device to emit light at the first wavelength along the first optical axis;
- positioning the light guiding device to transmit light at the second wavelength along the second optical axis and receive light at the first wavelength along the second optical axis; and
- positioning a light detecting device to detect at least one of the first and second wavelengths of light along the second optical axis.

19. A method as claimed in claim 18 wherein the reflection enhancing coating includes a plate.

20. A method as claimed in claim 19 wherein at least one of the bi-directional element and the plate includes at least one of glass, plastic, and another suitable optically transparent material which can be molded.

21. A method as claimed in claim 18 wherein the bi-directional element, the first lens system, and the second lens system are formed as a single unit of a molded plastic.

22. A method as claimed in claim 18 wherein the second lens system focuses light at the first wavelength in a direction along the second optical axis and focuses light at the second wavelength in an opposite direction along the second optical axis.

23. A method as claimed in claim 18 wherein the reflection enhancing coating includes at least one of silicon oxide (SiO), titanium oxide (TiO), tantalum oxide (TaO), magnesium fluoride (MgF), and another suitable coating material which reflects light at the first wavelength and transmits light at the second wavelength.

24. A method as claimed in claim 18 wherein the reflection enhancing coating includes a plurality of material layers with a thickness wherein the thickness of each of the plurality of material layers is chosen so that the reflection enhancing coating reflects light at the first wavelength and transmits light at the second wavelength.

* * * * *